(12) United States Patent
Uchida et al.

(10) Patent No.: US 10,839,839 B1
(45) Date of Patent: Nov. 17, 2020

(54) DATA STORAGE DEVICE MANAGING PEAK CURRENT FOR MULTIPLE ACTUATORS

(71) Applicant: Western Digital Technologies, Inc., San Jose, CA (US)

(72) Inventors: Hiroshi Uchida, Kanagawa (JP); Hidehiko Numasato, Kanagawa (JP); KeXiu Liu, Foothill Ranch, CA (US); Shrey Khanna, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/781,194

(22) Filed: Feb. 4, 2020

(51) Int. Cl.
*G11B 5/54* (2006.01)
*G11B 5/55* (2006.01)
*G11B 21/08* (2006.01)

(52) U.S. Cl.
CPC .......... *G11B 5/5547* (2013.01); *G11B 21/083* (2013.01)

(58) Field of Classification Search
CPC ... G11B 5/5547; G11B 5/59688; G11B 5/556; G11B 5/5526; G11B 5/5573; G11B 19/2063; G11B 19/00; G11B 5/54; G11B 19/2081; G11B 19/2072; G11B 19/06; G11B 5/58; G11B 5/5556

USPC .............. 360/78.14, 78.08, 78.07, 78.06, 75; 711/111, 112; 369/44.27, 47.1, 47.36, 369/47.38

See application file for complete search history.

(56) References Cited

U.S. PATENT DOCUMENTS

| | | | | |
|---|---|---|---|---|
| 6,995,946 | B2 * | 2/2006 | Ding ................... | G11B 5/5547 360/78.07 |
| 7,580,219 | B2 * | 8/2009 | Derosa ................ | G11B 5/5547 360/78.06 |
| 8,797,675 | B2 * | 8/2014 | Birtzer ................ | G11B 5/5547 360/78.08 |
| 10,014,018 | B1 * | 7/2018 | Kiyonaga ........... | G11B 21/025 |
| 10,049,691 | B1 | 8/2018 | Gaertner et al. | |
| 10,176,840 | B1 * | 1/2019 | Johnson ................ | G11B 19/02 |

* cited by examiner

*Primary Examiner* — Nabil Z Hindi (57) ABSTRACT

A data storage device is disclosed comprising a first actuator configured to actuate a first head over a first disk surface, and a second actuator configure to actuate a second head over a second disk surface. A first seek of the first head over the first disk surface is initiated during a first seek time based on a first seek profile. A second seek of the second head over the second disk surface is initiated during a second seek time based on a second seek profile. When the second seek time at least partially overlaps the first seek time and at least the second seek profile is a de-rated seek profile, the second seek profile is adjusted to avoid an overcurrent condition.

20 Claims, 8 Drawing Sheets

DATA STORAGE DEVICE MANAGING PEAK CURRENT FOR MULTIPLE ACTUATORS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
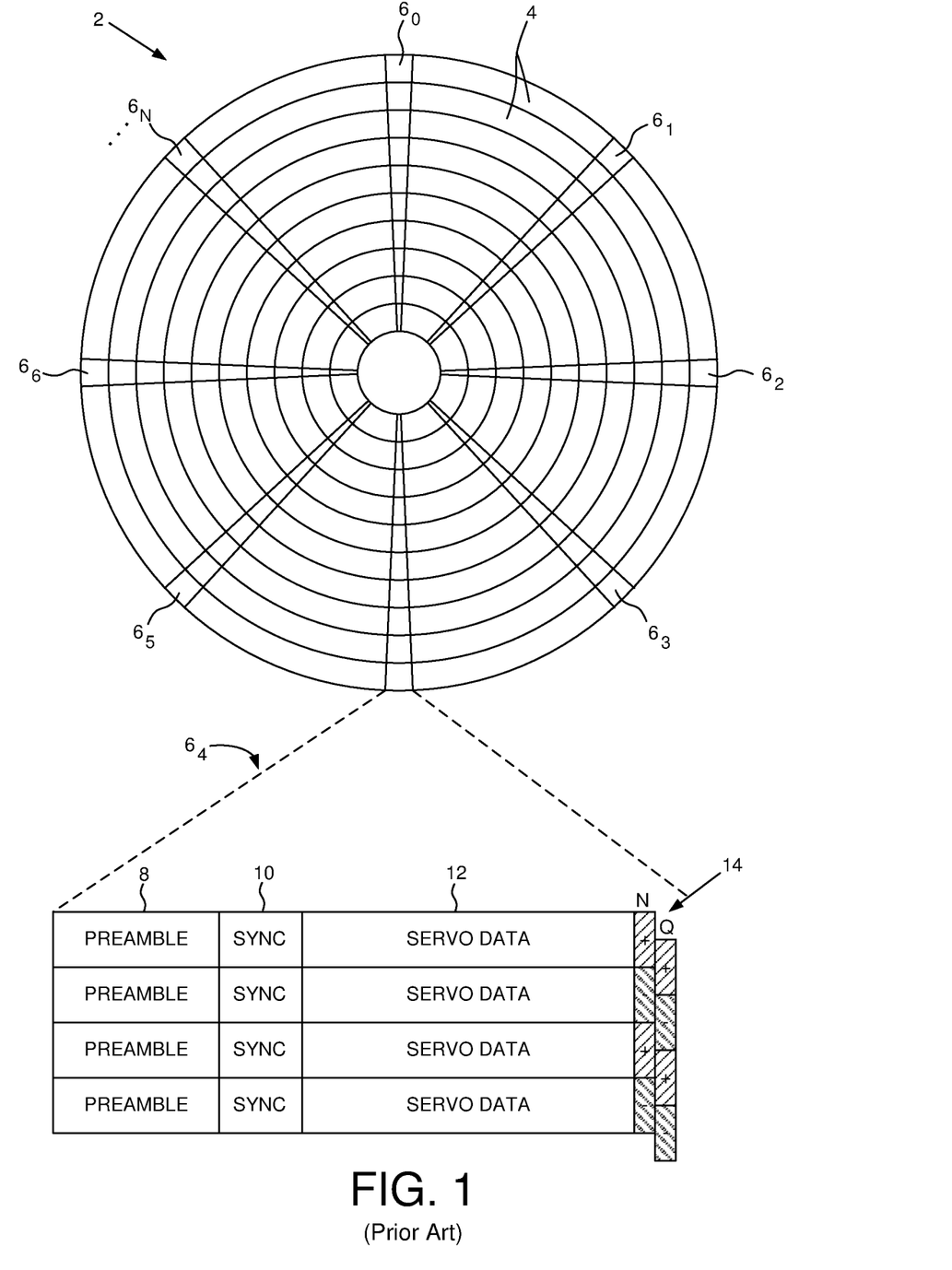
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
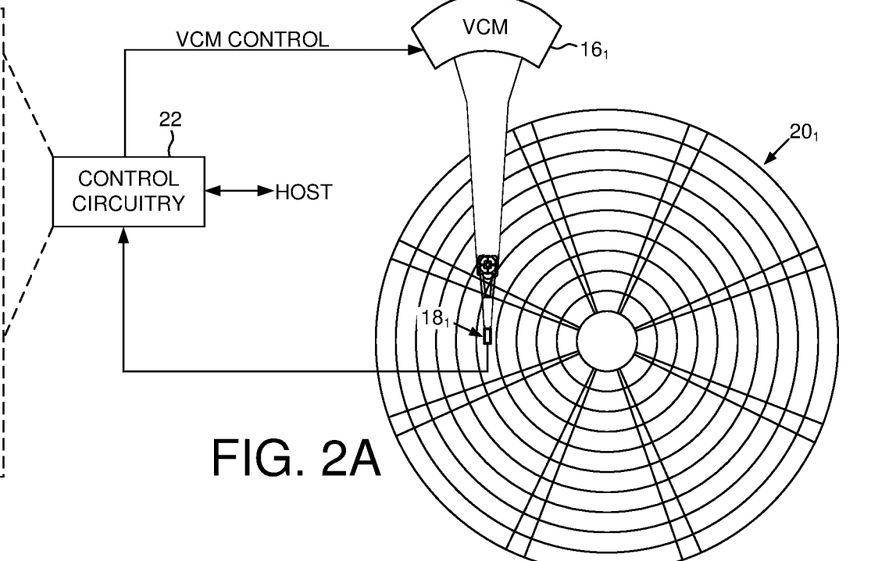
FIGS. 2A and 2B show a data storage device in the form of a disk drive according to an embodiment comprising multiple actuators configured to concurrently actuate heads over respective disk surfaces.
Figure 2B:
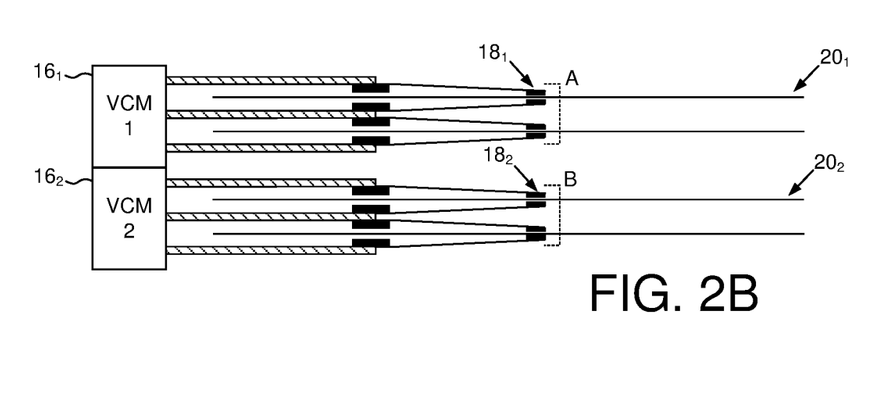
Figure 2C:
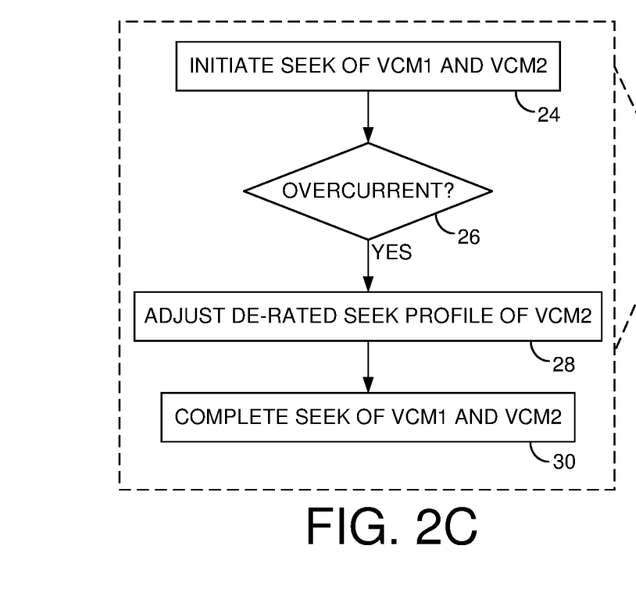
FIG. 2C is a flow diagram according to an embodiment wherein while concurrently seeking two actuators, a de-rated seek profile for at least one of the actuators is adjusted to avoid an overcurrent condition.

FIGS. 2A and 2B show a data storage device in the form of a disk drive according to an embodiment comprising a first actuator $16_1$ configured to actuate a first head $18_1$ over a first disk surface $20_1$, and a second actuator $16_2$ configured to actuate a second head $18_2$ over a second disk surface $20_2$. The disk drive further comprises control circuitry 22 configured to execute the flow diagram of FIG. 2C, wherein a first seek is initiated to seek the first head over the first disk surface during a first seek time based on a first seek profile, and a second seek is initiated to seek the second head over the second disk surface during a second seek time based on a second seek profile, wherein the second seek time at least partially overlaps the first seek time and at least the second seek profile is a de-rated seek profile (block 24). When an overcurrent condition is detected (block 26), the second seek profile is adjusted to avoid the overcurrent condition (block 28) and the first and second seeks are completed (block 30).

Any suitable actuators may be employed to seek the heads over respective disk surfaces, wherein in the embodiment of FIG. 2A a first voice coil motor (VCM) $16_1$ rotates a first set of actuator arms about a pivot, and a second VCM $16_2$ rotates a second set of actuator arms about the pivot in a configuration referred to as a dual actuator. In other embodiments, each VCM may rotate respective actuator arms about independent pivots (e.g., first and second VCMs mounted at opposite sides of the disks). In addition, each head may be actuated by any suitable secondary actuator, such as a secondary actuator configured to actuate a suspension relative to the actuator arm, and/or a secondary actuator configured to actuate the head relative to the suspension.

In one embodiment, the amount of current the disk drive may draw from a supply voltage may be limited due, for example, to a current limit of a power supply that is powering the disk drive. When the current limit is exceeded, it may cause a supply voltage to fall below an emergency threshold causing an emergency power-fail procedure to retract the heads from the disks before the air bearing dissipates. When the seek profiles of the multiple actuators overlap, and particularly when the acceleration or deceleration phase of the seek profiles overlap, the combined current draw of both actuators may cause an overcurrent condition. Accordingly in one embodiment when an overcurrent condition is detected while concurrently seeking the first and second VCMs $16_1$ and $16_2$, at least one of the seek profiles is adjusted in order to avoid the overcurrent condition.

Figure 3A:
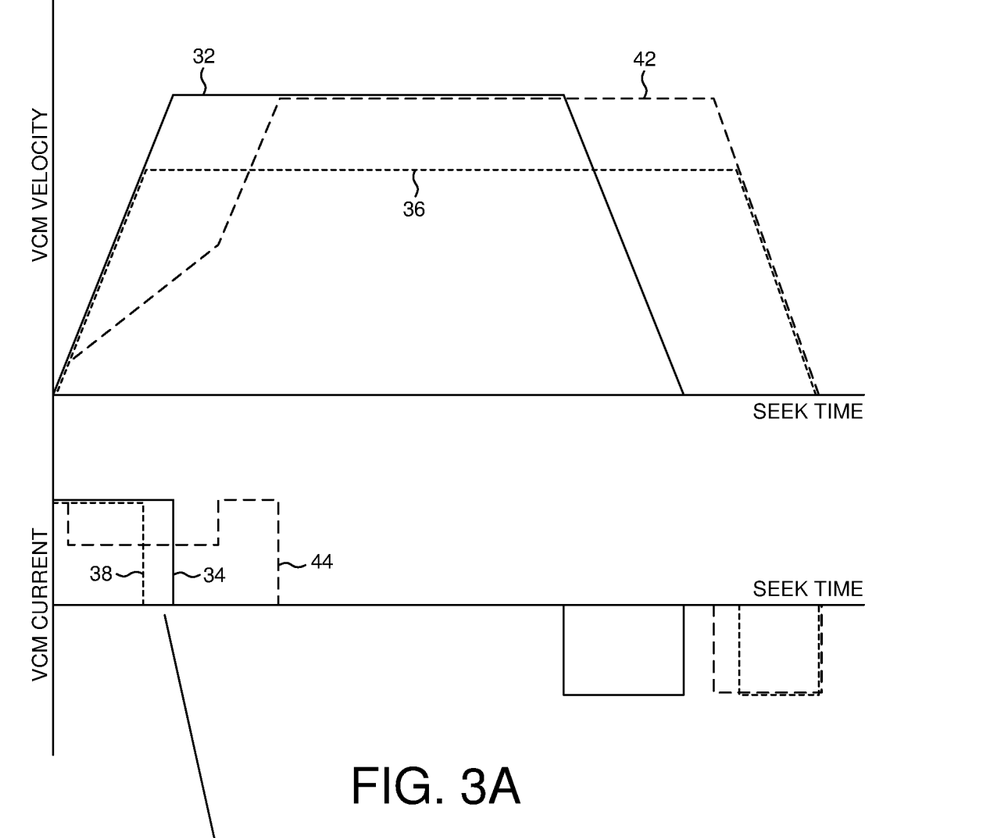
FIGS. 3A and 3B show an embodiment wherein an acceleration phase of a de-rated seek profile is adjusted to avoid the overcurrent condition.
Figure 3B:
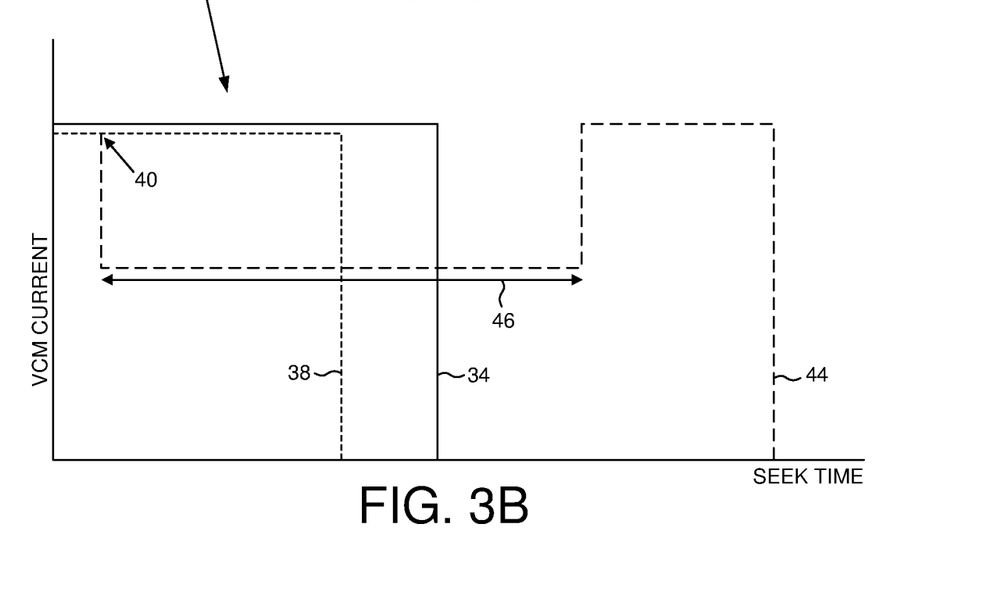

In one embodiment, the control circuitry 22 may seek a head based on a de-rated seek profile to achieve a just-in-time (JIT) seek wherein the head arrives at the target data track just before reaching the target data sector of the access command, thereby reducing the power consumption of the seek. That is when there is sufficient time for the head to reach a target data track, the seek profile may be de-rated so that the coast velocity is less than a maximum coast velocity, thereby reducing the power consumed during the acceleration and deceleration phase of the seek. FIG. 3A shows an example normal seek profile 32 with corresponding driving current 34 for the first VCM $16_1$, and a de-rated seek profile 36 with corresponding driving current 38 for the second VCM $16_2$. The acceleration phase of the first seek profile 32 causes the first VCM $16_1$ to reach a maximum coast velocity, whereas the acceleration phase of the second, de-rated seek profile 36 causes the second VCM $16_2$ to reach a coast velocity that is less than the maximum coast velocity. In this example, a seek operation for each VCMs is initiated concurrently such that the combined current draw of both VCMs causes an overcurrent condition 40 during the acceleration phase (a magnified view of the acceleration phase is shown in FIG. 3B). In order to avoid the overcurrent condition, the control circuitry 22 adjusts the de-rated seek profile 36 for the second VCM $16_2$ to seek profile 42 with corresponding driving current 44. In this embodiment, the de-rated seek profile 36 is adjusted by decreasing the acceleration current applied to the second VCM $16_2$ for a clamp interval 46 as shown in FIG. 3B. This decrease in acceleration during the clamp interval 46 avoids the overcurrent condition by decreasing the combined current draw of both VCMs. In one embodiment, after the clamp interval 46 the control circuitry 22 increases the acceleration current applied to the second VCM $16_2$ (as shown in FIG. 3B) so that the second VCM $16_2$ reaches the maximum coast velocity, thereby causing the second VCM to "catch up" the lost seek distance due to clamping the acceleration during the clamp interval 46. In one embodiment, the clamp interval 46 is configured by the control circuitry 22 so that the head may decelerate along the same trajectory of the de-rated, JIT seek profile 36. In this manner, the power consumption of the adjusted seek profile 42 may be minimized while maintaining the same seek performance (seek time) as the de-rated, JIT seek profile 36.

Figure 4A:
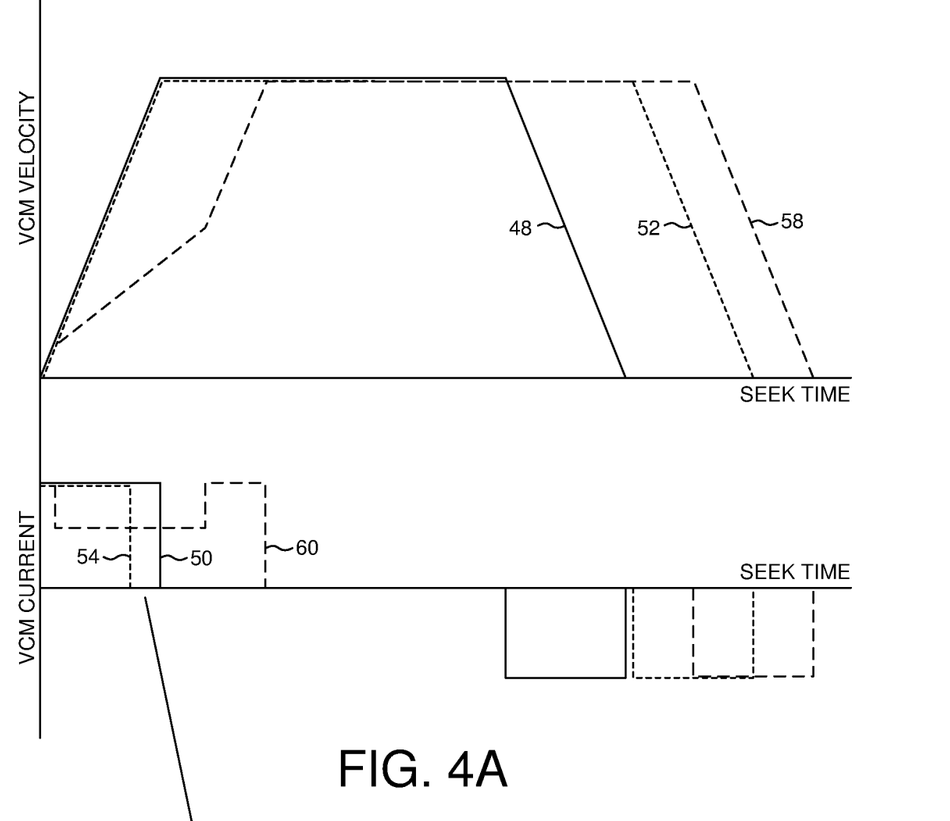
FIGS. 4A and 4B show an embodiment wherein an acceleration phase of a normal seek profile is adjusted to avoid the overcurrent condition.
Figure 4B:
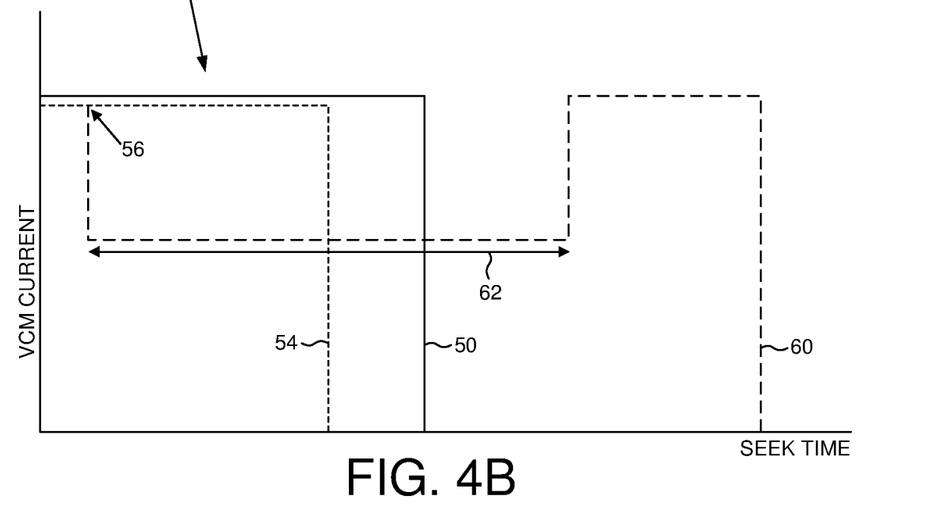

FIG. 4A shows an embodiment wherein a first normal seek profile 48 with corresponding driving current 50 is used to seek the first VCM $16_1$, and a second normal seek profile 52 with corresponding driving current 54 is used to concurrently seek the second VCM $16_2$. When an overcurrent condition 56 is detected during the acceleration phase of the concurrent seeks as shown in FIG. 4B, the control circuitry 22 adjusts the seek profile for one of the VCMs to avoid the overcurrent condition. In this example, the normal seek profile 52 for the second VCM $16_2$ is adjusted to seek profile 58 with corresponding driving current 60. The normal seek profile 52 is adjusted by decreasing the acceleration current applied to the second VCM $16_2$ during a clamp interval 62, thereby decreasing the combined current draw of both VCMs. In this example since the seek profile for each VCM is a normal seek profile (not de-rated), adjusting the seek profile to avoid the overcurrent condition means the corresponding head may reach the target data track late (due to the extended seek time). When the head arrives late to the target data track (after the target data sector has passed the head), it may increase the command access time due to a "slipped" revolution needed for the target data sector to reach the head. However, adjusting the seek profile for only one of the VCMs as compared to both VCMs means there is a decrease in throughput performance (increase in access latency) for only one of the VCMs rather than decreasing the throughput performance of both VCMs.

Figure 5A:
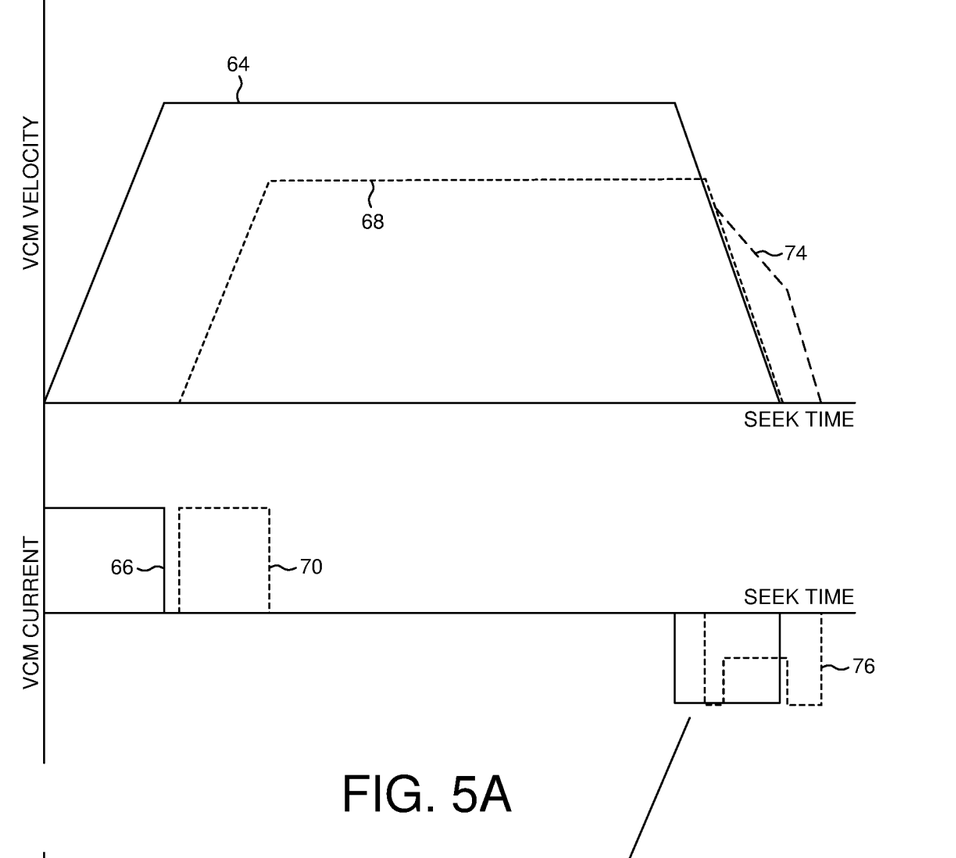
FIGS. 5A and 5B show an embodiment wherein a deceleration phase of a seek profile is adjusted to avoid the overcurrent condition.
Figure 5B:
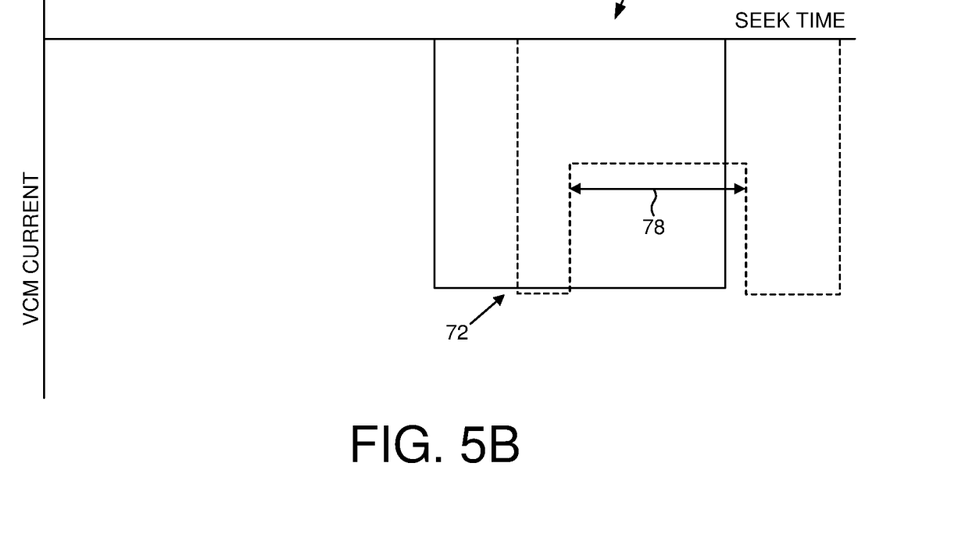

FIG. 5A shows an embodiment wherein a first normal seek profile 64 with corresponding driving current 66 is used to seek the first VCM $16_1$, and a second, de-rated seek profile 68 with corresponding driving current 70 is used to concurrently seek the second VCM $16_2$. In this example, an overcurrent condition 72 is detected during the deceleration phase of the seeks since there is an overlap in the deceleration driving currents as shown in FIG. 5B. In order to avoid the overcurrent condition, the control circuitry 22 adjusts the seek profile for one of the VCMs in order to decrease the combined current draw of both VCMs. In this example, the de-rated seek profile 68 for the second VCM $16_2$ is adjusted to seek profile 74 with corresponding driving current 76. The de-rated seek profile 68 is adjusted by decreasing the deceleration current applied to the second VCM $16_2$ during a clamp interval 78, thereby decreasing the combined current draw of both VCMs. In one embodiment, the duration of the clamp interval 78 corresponds to the duration of overlap between the deceleration driving currents of both VCMs as shown in FIG. 5B. After the clamp interval 78, in one embodiment the control circuitry 22 may increase the deceleration current in order to quickly decelerate the affected VCM toward the target data track. In this manner the affected head may or may not reach the target data track prior to the target data sector depending on the duration of the clamp interval 78 (and overlap of the deceleration currents). When the affected head reaches the target data track late, it may increase the latency of the access command due to slipping a disk revolution as described above.

In one embodiment, the seek profile for seeking a VCM may be de-rated (such as the de-rated seek profile 36 in FIG. 3A) when the seek profile terminates within a predetermined distance (e.g., within a predetermined number of servo tracks) from an inner diameter or outer diameter of the corresponding disk surface. The seek profile may be de-rated in order to decrease the coast velocity of the VCM, thereby reducing or eliminating any overshoot that may occur at the end of the deceleration phase. That is, seeking a head using a normal seek profile (and maximum coast velocity) may result in the head overshooting the target data track, and if the target data track is near the inner diameter or outer diameter of the disk surface, an overshoot may cause the head to lose synchronization to the servo sectors. Accordingly, in one embodiment the control circuitry 22 may adjust a de-rated seek profile in order to avoid an overcurrent condition (as described above) when the de-rated seek profile does not terminate within a predetermine distance from an inner diameter or outer diameter of the disk surface.

Figure 6:
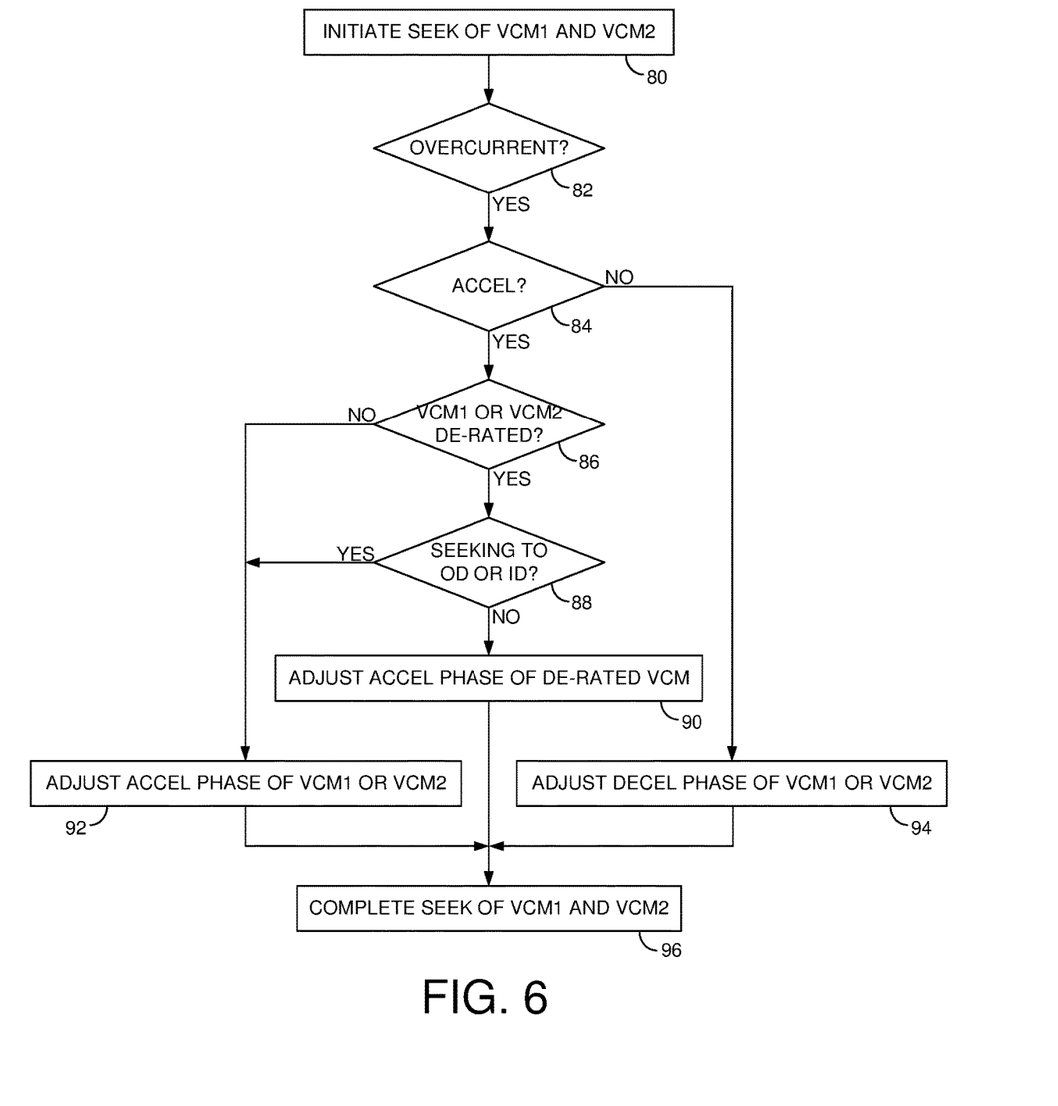
FIG. 6 is a flow diagram according to an embodiment wherein a de-rated seek profile may not be adjusted when the seek profile terminates within a predetermined distance from an outer diameter or inner diameter of the disk surface.

An example of this embodiment is understood with reference to the flow diagram of FIG. 6, wherein a seek is initiated for the first VCM $16_1$ and the second VCM $16_2$ (block 80). If an overcurrent condition is detected (block 82) during an overlap of the acceleration phase of the seeks (block 84), and at least one of the seek profiles of each VCM is a de-rated seek profile such as shown in FIG. 3A (block 86), the de-rated seek profile is evaluated to determine if it terminates within a predetermined distance from an inner diameter or an outer diameter of the disk surface (block 88). When the de-rated seek profile of at least one of the VCMs does not terminate near the inner diameter or outer diameter of the disk surface (block 88), the seek profile is adjusted to avoid the overcurrent condition (block 90) such as described above. If neither seek profile is de-rated at block 86, or if de-rated seek profile(s) terminate within a predetermined distance from the inner or outer diameter at block 88, then the acceleration phase of the seek profile for a selected one of the VCMs is adjusted to avoid the overcurrent condition (block 92) which may result in a slipped revolution of latency for the corresponding head as described above. Similarly if the overcurrent condition is detected during a deceleration phase of the seeks at block 84, then the deceleration phase of the seek profile for a selected one of the VCMs is adjusted to avoid the overcurrent condition (block 94) which may result in a slipped revolution of latency for the corresponding head as described above after completing the seek operations at block 96.

In one embodiment when the seek profiles for both VCMs are normal seek profiles (not de-rated or slightly de-rated), and both seek profiles terminate near the inner or outer diameter of the disk, one of the seek profiles may be modified to avoid an overcurrent condition by adding a revolution of latency to one of the seeks. That is, a normal seek profile may be modified based on an additional revolution of latency, which in one embodiment means the normal seek profile may be converted into a de-rated seek profile due to the increased seek time. If an overcurrent condition still occurs due to concurrently seeking both VCMs (e.g., during the acceleration phase of concurrent seeks), the de-rated seek profile may be modified as described above in order to avoid the overcurrent condition.

In one embodiment, the access commands received from the host may be queued in a command queue and sorted into an optimal execution order using a rotational position optimization (RPO) algorithm. The RPO algorithm may be adapted over time based on a measured seek time for each seek operation (i.e., each seek length). That is, the estimated seek times for each seek length in the RPO algorithm may be adjusted over time based on the actual seek times measured after each seek operation. However when a slipped revolution of latency occurs due to modifying a seek profile to avoid an overcurrent condition as described above, in one embodiment the corresponding measured seek time is not used to adapt the RPO algorithm. This is because modifying a seek profile to avoid an overcurrent condition occurs infrequently, and may therefore be ignored as an outlier when adapting the RPO algorithm.

Figure 7A:
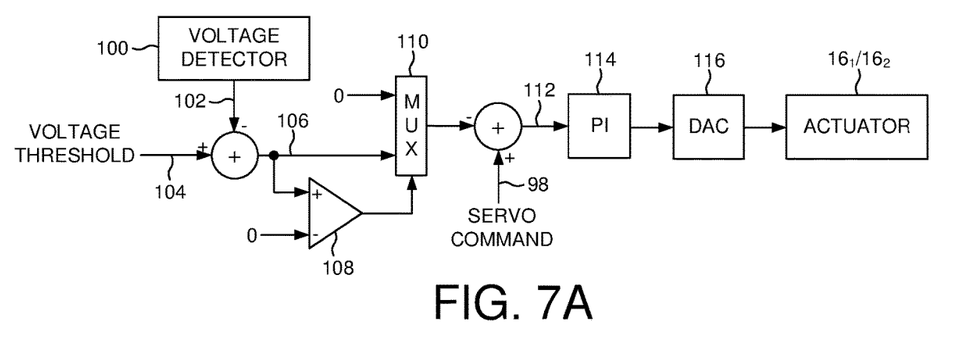
FIG. 7A shows an embodiment wherein a control signal applied to an actuator closed loop based on a detected supply voltage in order to maintain the supply voltage near a target threshold.

Referring again to the example of FIG. 3B, in one embodiment the acceleration current is decreased open loop to a predetermined lower level during the clamp interval 46 that ensures the overcurrent condition is avoided. In another embodiment, the acceleration current may be decreased closed loop based on a detected supply voltage in order to maintain the supply voltage near a target threshold, or based on a detected supply current in order to maintain the supply current near a target threshold. FIG. 7A shows an example of this embodiment wherein a servo command 98 may be generated based on a seek profile, such as the de-rated seek profile 36 shown in FIG. 3A. A suitable voltage detector 100 monitors a supply voltage of the disk drive, wherein the detected amplitude 102 of the supply voltage will fall below a threshold voltage 104 when an overcurrent condition occurs. Accordingly in this embodiment, the detected amplitude 102 of the supply voltage is subtracted from the threshold voltage 104 to generate an error signal 106. When the error signal 106 is positive at comparator 108, a multiplexer 110 is configured to output the error signal 106 which is subtracted from the servo command 98 to generate an adjusted servo command 112 (e.g., to decrease an acceleration current). The adjusted servo command 112 is filtered using a suitable compensation filter 114 and then converted into an analog control signal by a digital-to-analog converter (DAC) 116. The analog control signal is applied to the corresponding actuator, such as the first VCM $16_1$ or the second VCM $16_2$. In this manner, the amplitude 102 of the supply voltage is maintained near the target threshold 104, thereby maximizing the performance of both VCMs while avoiding the overcurrent condition.

Figure 7B:
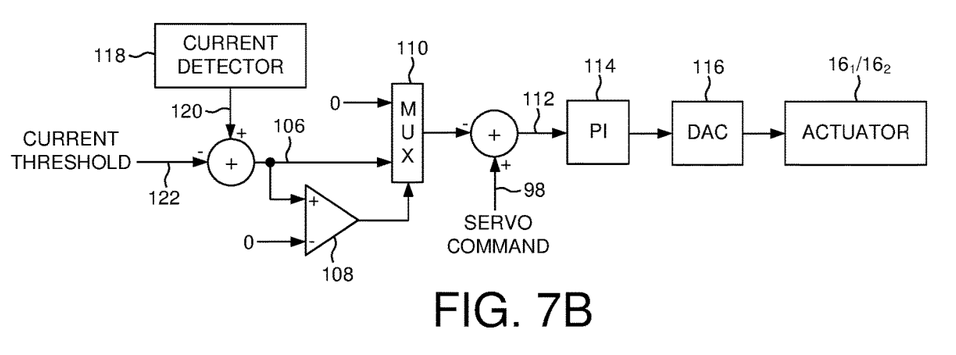
FIG. 7B shows an embodiment wherein a control signal is applied to an actuator closed loop based on a detected supply current in order to maintain the supply current near a target threshold.

In an alternative embodiment shown in FIG. 7B, an overcurrent condition is detected based on the current draw of the disk drive. A suitable current detector 118 detects an amplitude 120 of a supply current which is compared to a target threshold 122. When the detected amplitude 120 of the supply current exceeds the target threshold 122, the resulting error signal 106 becomes positive and is therefore subtracted from the servo command 98 in order to reduce the amplitude of the control signal applied to the corresponding actuator. In this manner, the amplitude 120 of the supply current is maintained near the target threshold 122, thereby maximizing the performance of both VCMs while avoiding the overcurrent condition.

Figure 8A:
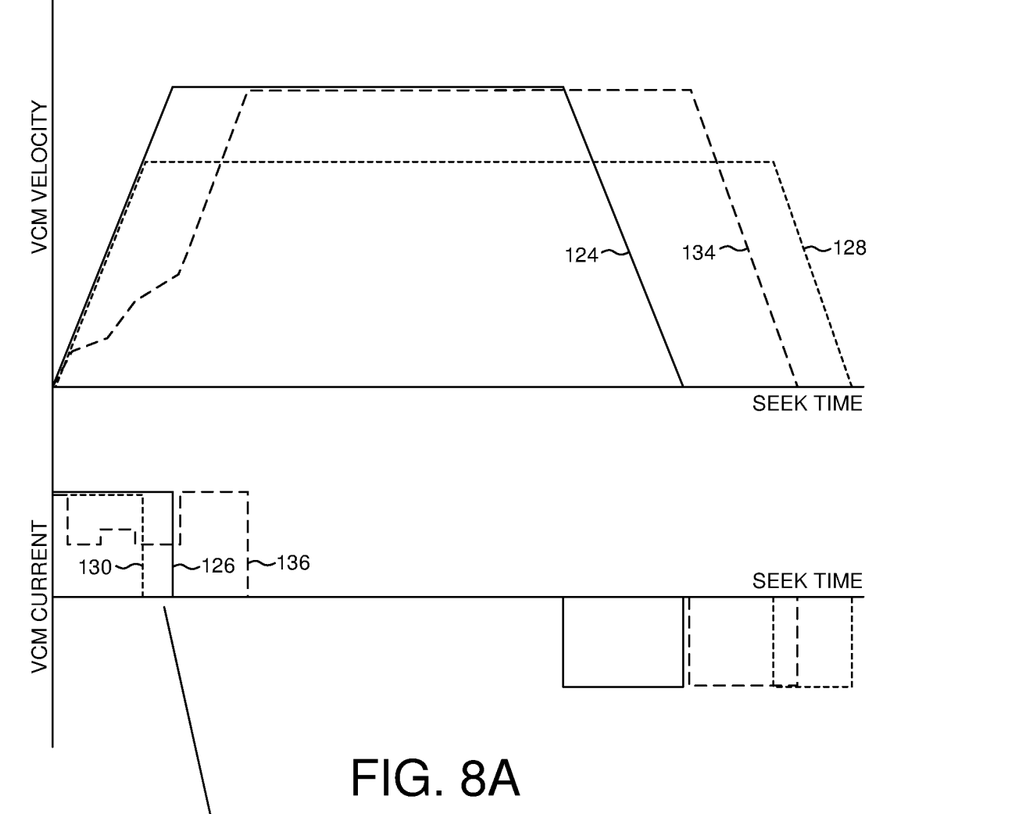
FIGS. 8A and 8B show an embodiment wherein an acceleration phase of a de-rated seek profile may be adjusted to maintain a supply voltage or a supply current near a target threshold.
Figure 8B:
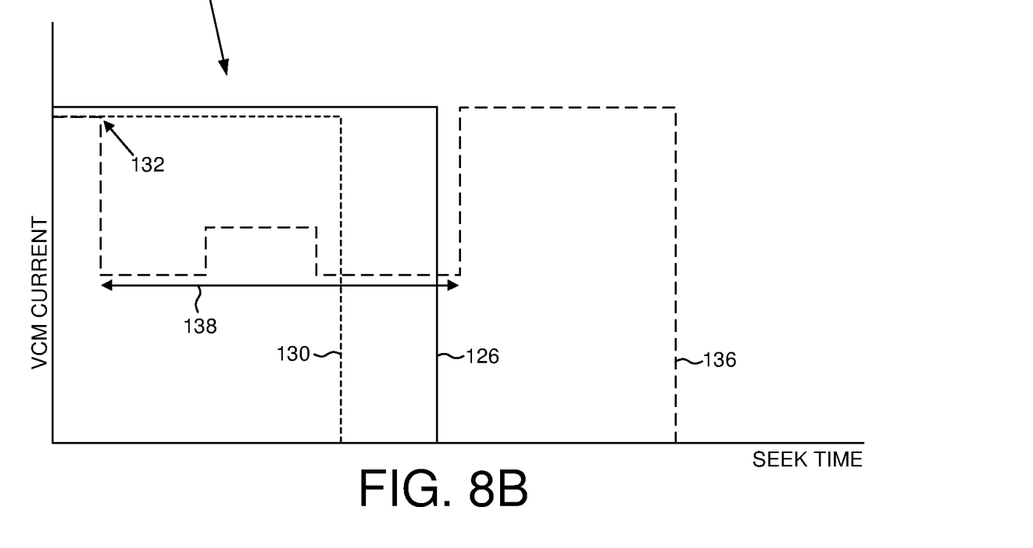

FIG. 8A shows an embodiment wherein a first, normal seek profile 124 with corresponding driving current 126 is used to seek the first VCM, and a second, de-rated seek profile 128 with corresponding driving current 130 is used to seek the second VCM (wherein the second seek profile does not terminate near the inner or outer diameter of the disk surface). During the acceleration phase of the seeks, an overcurrent condition 132 is detected due to the overlapping acceleration currents as shown in FIG. 8B, and so the second, de-rated seek profile 128 is adjusted to seek profile 134 with corresponding driving current 136. In this embodiment, the acceleration current 136 may be adjusted closed-loop during the clamp interval 138 as shown in FIG. 8B in order to maintain a supply voltage or a supply current near a target threshold as described above. At the end of the clamp interval 138, the acceleration current 136 may be increased to a maximum until the velocity of the second VCM $16_2$ reaches the maximum coast velocity so as to catch up the lost seek distance due to clamping the acceleration current. Also in this embodiment, the clamp interval 138 terminates at the end of the overlapping acceleration currents rather than configured to achieve a JIT arrival as in the embodiment of FIGS. 3A and 3B. Accordingly in this embodiment, the head may arrive at the target data track early by following the adjusted seek profile 134 as compared to following the de-rated seek profile 128 shown in FIG. 8A. This embodiment may simplify the computation of the clamp interval 138 when adjusting the acceleration current closed loop to avoid the overcurrent condition at the expense of higher power consumption due to following the adjusted seek profile 134.

In one embodiment, the data storage device may comprise more than two actuators (e.g., more than two VCMs) wherein concurrently seeking two or more of the actuators may result in an overcurrent condition. Accordingly the aspects in the embodiments described above may be extended to account for concurrently seeking more than two actuators, such as by modifying more than one seek profile in order to avoid an overcurrent condition.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
 a first disk surface;
 a first head;
 a first actuator configured to actuate the first head over the first disk surface;
 a second disk surface;
 a second head;
 a second actuator configure to actuate the second head over the second disk surface; and
 control circuitry configured to:
  first seek the first head over the first disk surface during a first seek time based on a first seek profile;
  second seek the second head over the second disk surface during a second seek time based on a second seek profile, wherein the second seek time at least partially overlaps the first seek time and at least the second seek profile is a de-rated seek profile; and
  adjust the second seek profile to avoid an overcurrent condition.

2. The data storage device as recited in claim 1, wherein the control circuitry is further configured to adjust the second seek profile by decreasing an acceleration current applied to the second actuator for a clamp interval.

3. The data storage device as recited in claim 2, wherein after the clamp interval the control circuitry is further configured to increase the acceleration current applied to the second actuator.

4. The data storage device as recited in claim 3, wherein the control circuitry is further configured to increase the acceleration current to a maximum level until the second actuator reaches a maximum velocity.

5. The data storage device as recited in claim 4, wherein the control circuitry is further configured to set the clamp interval to achieve a just-in-time (JIT) arrival of the second head at the end of the second seek.

6. The data storage device as recited in claim 1, wherein when the second seek profile terminates within a predetermined distance from an inner diameter or outer diameter of the second disk surface, the control circuitry is further configured to adjust the first seek profile to avoid the overcurrent condition.

7. The data storage device as recited in claim 6, wherein first seek profile is a de-rated seek profile.

8. The data storage device as recited in claim 1, wherein the control circuitry is further configured to adjust a control signal applied to the second actuator closed loop based on a detected supply voltage in order to maintain the supply voltage near a target threshold.

9. The data storage device as recited in claim 1, wherein the control circuitry is further configured to adjust a control signal applied to the second actuator closed loop based on a detected supply current in order to maintain the supply current near a target threshold.

10. A data storage device comprising:
 a first disk surface;
 a first head;
 a first actuator configured to actuate the first head over the first disk surface;
 a second disk surface;
 a second head;
 a second actuator configure to actuate the second head over the second disk surface; and
 control circuitry configured to:
  first seek the first head over the first disk surface during a first seek time based on a first seek profile;
  second seek the second head over the second disk surface during a second seek time based on a second seek profile; and
  when the first seek profile terminates within a predetermined distance from an inner diameter or outer diameter of the first disk surface, adjust the second seek profile to avoid an overcurrent condition.

11. The data storage device as recited in claim 10, wherein the control circuitry is further configured to adjust the second seek profile by decreasing an acceleration current applied to the second actuator for a clamp interval.

12. The data storage device as recited in claim 11, wherein after the clamp interval the control circuitry is further configured to increase the acceleration current applied to the second actuator.

13. The data storage device as recited in claim 12, wherein the control circuitry is further configured to increase the acceleration current to a maximum level until the second actuator reaches a maximum velocity.

14. The data storage device as recited in claim 13, wherein the control circuitry is further configured to set the clamp interval to achieve a just-in-time (JIT) arrival of the second head at the end of the second seek.

15. The data storage device as recited in claim 10, wherein the control circuitry is further configured to adjust the second seek profile by adjusting a control signal applied to the second actuator closed loop based on a detected supply voltage in order to maintain the supply voltage near a target threshold.

16. The data storage device as recited in claim 10, wherein the control circuitry is further configured to adjust the second seek profile by adjusting a control signal applied to the second actuator closed loop based on a detected supply current in order to maintain the supply current near a target threshold.

17. A data storage device comprising:
a first disk surface;
a first head;
a second disk surface;
a second head;
a means for first seeking the first head over the first disk surface during a first seek time based on a first seek profile;
a means for second seeking the second head over the second disk surface during a second seek time based on a second seek profile, wherein the second seek time at least partially overlaps the first seek time and at least the second seek profile is a de-rated seek profile; and
a means for adjusting the second seek profile to avoid an overcurrent condition.

18. The data storage device as recited in claim 17, wherein at least the second seek profile is a de-rated seek profile.

19. The data storage device as recited in claim 17, wherein the means for adjusting the second seek profile comprises a means for decreasing an actuator acceleration current for a clamp interval corresponding to a just-in-time (JIT) arrival of the second head at the end of the second seek.

20. The data storage device as recited in claim 17, wherein when the second seek profile terminates within a predetermined distance from an inner diameter or outer diameter of the second disk surface, the data storage device further comprises a means for adjusting the first seek profile to avoid the overcurrent condition.

\* \* \* \* \*